Nov. 12, 1957   R. J. LEMA   2,812,609
FISHING LURE
Filed Oct. 25, 1954   2 Sheets-Sheet 2
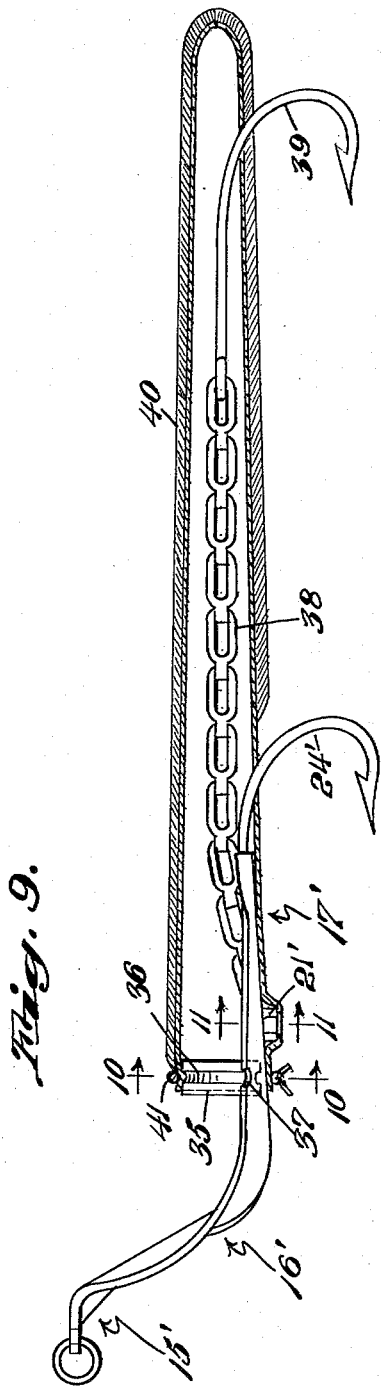
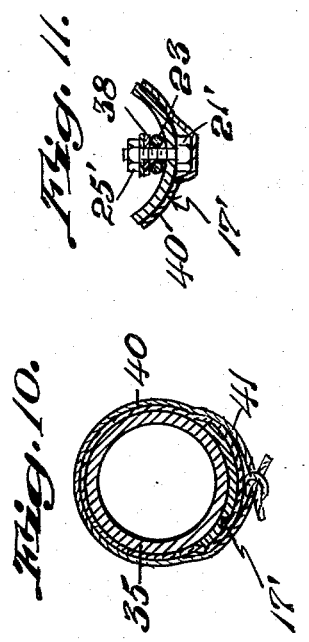
INVENTOR.
Richard J. Lema
BY
Barlow & Barlow
ATTORNEYS.

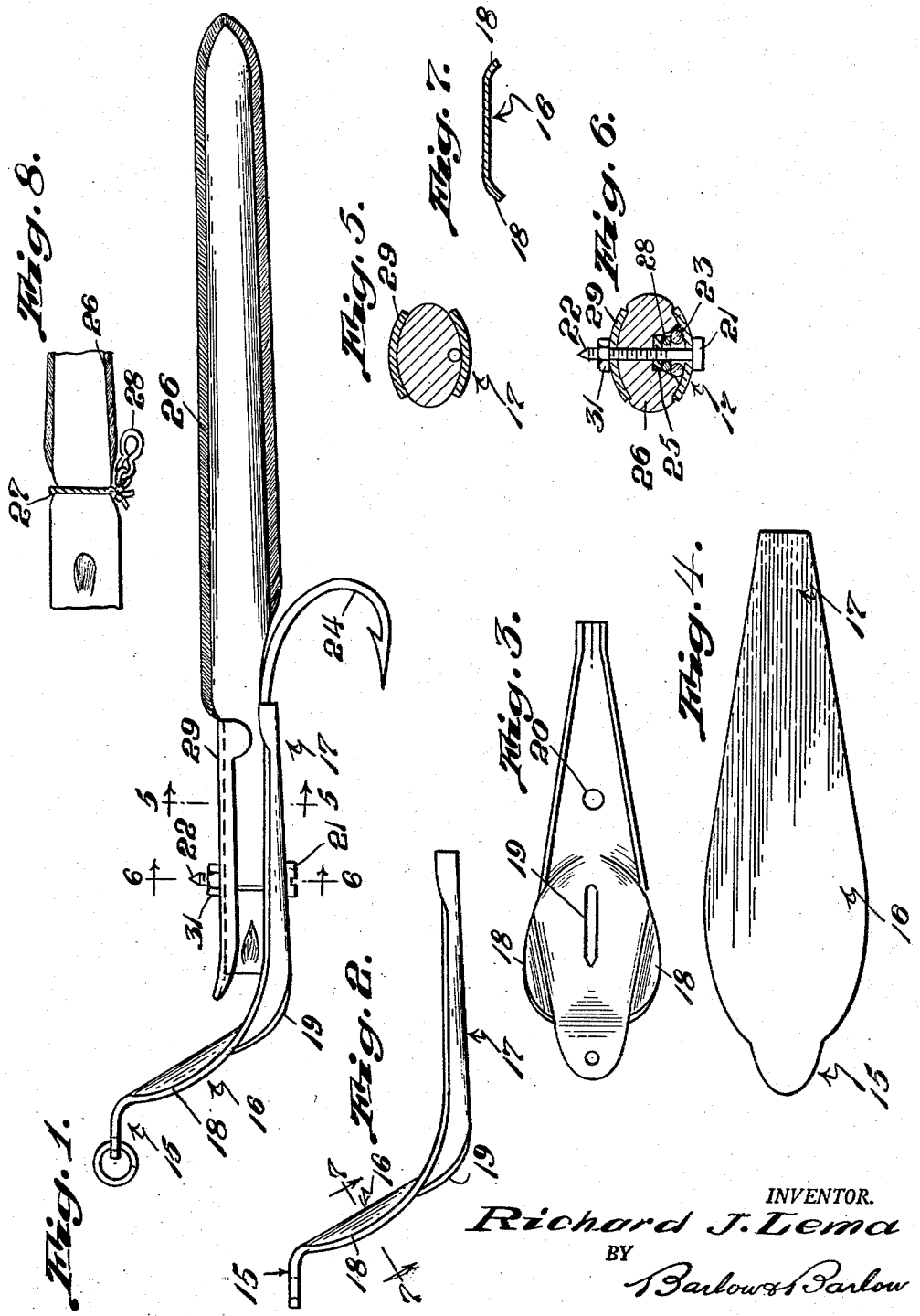

United States Patent Office 2,812,609
Patented Nov. 12, 1957

2,812,609

FISHING LURE

Richard J. Lema, East Providence, R. I., assignor to Evans Case Co., a corporation of Massachusetts Application October 25, 1954, Serial No. 464,266

3 Claims. (Cl. 43—42.28)

This invention relates to an improved fish lure which may be utilized in casting in surf fishing and as a trolling fish lure.

In fishing it is desirable to provide a lure which will not merely attract fish but which will also cause them to strike at the lure. To this end it has been proposed to utilize natural bait as a source of attraction for the fish to give the appearance of another fish swimming through the water. Eel skins have also come into common usage for attracting certain types of fish, but in order to keep these eel skins or ells fresh, they must be immersed in a pickle solution which tends to stiffen the eel or the eel skin. In some of the prior art devices with which I am familiar the eel or eel skin when attached to the rig will tend to twist the line rather than simulate any swimming motion.

It is therefore one of the objects of my invention to provide a fishing lure which is constructed in a manner to prevent twisting of the eel or eel skin when attached to the lure.

Another object of the invention is to improve upon lures generally and provide a natural swimming, wiggling motion to an eel or eel skin when trolled at slow or fast rates.

A still further object of the invention is to provide in a lure the motion of which may be controlled by controlling the shape of the lure body and thus adjusting the side to side motion of the lure.

A still further object of the invention is to provide a simple attachment means for an eel or eel skin or other artificial attraction material.

With these and other objects in view, the invention consists of certain novel features of construction as will be more fully described and particularly pointed out in the appended claims.

In the accompanying drawings:

Figure 1 is a side elevational view of the fish lure with an eel fixed thereto;

Figure 2 is a detail side elevational view of a portion of the lure alone that has been bent into shape;

Figure 3 is a bottom view of the lure portion shown in Figure 2;

Figure 4 is a plan view of the blank from which the lure portion is formed;

Figure 5 is a sectional view taken on line 5—5 of Figure 1 with parts beyond the line in the direction of the arrows being omitted for clarity;

Figure 6 is a sectional view taken on line 6—6 of Figure 1 with parts beyond the line in the direction of the arrows being omitted for clarity;

Figure 7 is a sectional view taken on line 7—7 of Figure 2 with parts beyond the line in the direction of the arrows being omitted for clarity;

Figure 8 is a partial elevational view of a preferred method of tying the eel body for use with the lure;

Figure 9 is a side elevational view of a modification of the lure with an eel skin, shown in section, attached to the lure;

Figure 10 is a sectional view taken on line 10—10 of Figure 9; and

Figure 11 is a sectional view taken on line 11—11 of Figure 9 with parts beyond the line in the direction of the arrows being omitted for clarity.

In proceeding with the invention, I provide a generally S-shaped lure in which the lower portion of the S is longer than the top portion. The top portion of this S-shaped lure is utilized for attaching the line, the middle portion curving slightly at the edges to provide the action or wiggling motion that is secured through the utilization of this lure. The lower part of the S-shaped structure is utilized for attaching fish-attracting devices such as eels or eel skins and is provided with at least one hook which is fastened to the end of the lure with a provision for utilizing a second hook that may be trailed on the end of a chain also affixed to the lure.

Referring now to the drawings, the lure consists of a generally spoon-shaped structure having a leading head portion or line-attaching portion 15, an intermediate portion 16, and an end or tail portion 17. The general outline shape of the lure blank is best shown in Figure 4. The leading or line-attaching portion 15, it will be noted, is very narrow, providing just enough area to accommodate an eye for the attaching of a line. The intermediate area 16, however, bulges outwardly very rapidly from the leading portion and then tapers gently toward the tail portion 17. When bent into the shape as shown in Figure 2, it will be noted that the plane of the leading line-attaching portion 15 is practically parallel to the tail portion 17, the intermediate portion 16 connecting these two portions on a rather sharp slope. Located on the lower bend where the intermediate portion 16 meets the tail portion 17 a protrusion 19 has been struck from the metal so as to give it more strength at the bend portion. This is more particularly shown in Figure 3. The main bulge of the intermediate portion is bent at the edges thereof to form lips 18 that extend at an obtuse angle thereto. When bent, it will be seen by referring to Figure 7 that the intermediate portion assumes a slightly concave cross section. Thus, as the lure is pulled through the water, the flow will be out toward the lips.

Along the tail portion 17 a hole 20 has been formed through which passes a bolt 21. This bolt 21 serves as a point of attachment for the eye 23 of the hook 24 which is held in place by means of a nut 25, as shown in Figure 6. It will be noted that the top end of the bolt 21 is provided with a pointed end 22 which allows it to pass more readily through an eel body or flexuous element such as 26. Before fastening the eel body to the lure it is preferred to tie a cord such as 27 around the head end thereof and affix a small length of chain such as 28 to this cord. An eye of the chain 28 is then slipped over the bolt 21 and the point 22 passed up through the eel body. A top fastening plate 29, which is provided with a hole, is passed over the bolt 21, clamping the eel body 26 between it and the tail portion of the lure. This attaching plate portion 29 is secured in place by a nut 31, completing the entire structure and binding the whole together.

In Figure 9 I show a modification of the construction of the fastening means, this type of fastening means being particularly adapted for an eel skin. In this embodiment the lure structure is identical to that previously described being provided with line-attaching portion 15', intermediate portion 16', and tail portion 17'. To the tail portion 17' there has been fastened by welding or soldering a ring 35 which is provided with a depression 36 that co-operates with a notch 37 in the tail portion 17'. The bolt 21' in this instance affixes the loop 23' of the hook and additionally a chain 38 at the end of which is affixed the supplementary hook 39. The eel skin of flexuous element in this instance 40 is adapted to be slipped over the tail portion 17' and fastened to the ring 35 by tying with a cord 41, the cord lying within the depression 36 of ring 35 and about the tail portion 17'. In this construction it will be noted that the eel skin at the forward end thereof is maintained in an open position so that it may be filled with water as soon as the lure has been submerged. This allows the eel skin to maintain a filled-out shape and act the same as the body 26 described in the previous embodiment.

As the lure disclosed in these embodiments is drawn through the water, a pressure will be exerted against the intermediate portion 16, which is made in a slightly concave shape due to the presence of the lips 18. This will cause a pressure to be exerted also on the lips 18, and by reason of this fact the lure will tend to rock about a longitudinal axis drawn through the center thereof, the pressure first impinging upon one lip 18 and then on the other as it rocks back and forth. This action, of course, causes the eel body or the eel skin as the case might be to wiggle and simulate the swimming motion of an eel in water. Also due to the configuration of the lure it is difficult for it to turn over to drag through the water and remain in an inverted position inasmuch as the center of gravity is in the tail portion, causing the tail portion always to remain at the lower position as shown in the drawing.

It will thus be seen that I have provided a construction of a lure which will enable anyone to take the eel or the tail part of an eel and readily attach it to the lure. In the case of the eel body it may be forced on to the pointed end of the bolt and then the clamp 29 may be placed over the eel body and fastened with the nut 31. The hook 24 becomes fastened to the lure, utilizing the same screw or bolt 21, and is replaceable by simply removing the nut which holds it on to the bolt. The first embodiment shown in Figure 1 may be modified by providing a second hook on a chain as shown in Figure 9, the second hook being passed through the tail portion of the eel so as to have it available should any fish strike the lure from behind. With such a modification it is generally preferable that the chain be dispensed with in the case of the eel body and the fastening material being a fish line which may be readily threaded through the eel body. I have described and illustrated the above embodiments in connection with either an eel or an eelskin. It will be apparent, however, that other fish-attracting flexuous elements which may be either natural or artificial may be clamped beneath plate 29 or tied to the ring 35 in any suitable manner.

I claim:

1. A fish lure comprising an elongated spoon having a line attaching portion with a central opening at its forward end, an intermediate portion, and an end portion, said intermediate portion having a generally flat cross section with lips at the sides thereof extending at an obtuse angle thereto and generally forward toward said line attaching portion, said intermediate portion joining said line attaching and end portions at obtuse angles to dispose said portions on different planes, said line attaching and end portions extending on substantially parallel planes, said end portion having a concavo-convex cross-section with the concave portion thereof opening toward the intermediate portion and attachment means in said concave portion for attaching a flexuous element thereto.

2. A fish lure as in claim 1 wherein the means to attach a flexuous element comprises a pointed stud affixed to the end portion of the lure and a clamping plate, said plate being adapted to be adjustably fastened to said stud.

3. A fish lure as in claim 1 wherein the means to attach a flexuous element comprises a ring mounted generally perpendicular to the end portion of the lure in the concave portion thereof to allow the flexuous element to be tied thereto.

References Cited in the file of this patent

UNITED STATES PATENTS

| | | |
|---|---|---|
| 1,326,821 | Ackerman | Dec. 30, 1919 |
| 1,418,229 | Buddle | May 30, 1922 |
| 2,164,415 | Mallett | July 4, 1939 |
| 2,167,163 | Toepper | July 25, 1939 |
| 2,476,126 | Weiss | July 12, 1949 |
| 2,484,744 | Roman | Oct. 11, 1949 |
| 2,492,064 | Rauh | Dec. 20, 1949 |
| 2,594,038 | Lauterwasser | Apr. 22, 1952 |